(12) United States Patent
Badén et al.

(10) Patent No.: US 8,977,774 B2
(45) Date of Patent: *Mar. 10, 2015

(54) METHOD FOR REDUCING BUFFER CAPACITY IN A PIPELINE PROCESSOR

(75) Inventors: Thomas Badén, Solna (SE); Jakob Carlström, Uppsala (SE)

(73) Assignee: Marvell International Ltd., Hamilton (BM)

( * ) Notice: Subject to any disclaimer, the term of this patent is extended or adjusted under 35 U.S.C. 154(b) by 189 days.

This patent is subject to a terminal disclaimer.

(21) Appl. No.: 13/585,871

(22) Filed: Aug. 15, 2012

(65) Prior Publication Data

US 2012/0317398 A1 Dec. 13, 2012

Related U.S. Application Data

(63) Continuation of application No. 11/722,470, filed as application No. PCT/SE2005/001969 on Dec. 20, 2005, now Pat. No. 8,250,231.

(60) Provisional application No. 60/643,580, filed on Jan. 14, 2005.

(30) Foreign Application Priority Data

Dec. 22, 2004 (SE) ...................................... 0403128

(51) Int. Cl.
*G06F 9/30* (2006.01)
*G06F 15/16* (2006.01)
(Continued)

(52) U.S. Cl.
CPC .............. *H04L 47/10* (2013.01); *H04L 47/215* (2013.01); *H04L 47/22* (2013.01); *H04L 47/39* (2013.01)

USPC ..................... 709/233; 712/30; 712/E9.016

(58) Field of Classification Search
CPC ......... H04L 47/10; H04L 47/39; H04L 47/22; H04L 47/215
USPC ............................. 712/30, E9.016; 709/233
See application file for complete search history.

(56) References Cited

U.S. PATENT DOCUMENTS 6,049,816 A 4/2000 Kim et al.
6,389,479 B1 5/2002 Boucher et al.
(Continued)

FOREIGN PATENT DOCUMENTS

EP 1158726 A2 11/2001
WO WO-0161469 A2 8/2001
(Continued)

*Primary Examiner* — Peter Shaw

(57) ABSTRACT

A packet processor implemented in hardware. The packet processor includes a processing pipeline including a plurality of processing elements. The plurality of processing elements are configured to process a first data packet transferred sequentially through the plurality of processing elements. The first data packet includes information indicating a period of time that at least a first processing element of the plurality of processing elements uses to process the first data packet. The first processing element is prevented from processing other data packets due to performing processing on the first data packet during the period of time. A packet rate shaper is configured to, prior to the first data packet entering the processing pipeline, read the information in the first data packet, selectively increment and decrement a token value, and selectively grant the first data packet access to the processing pipeline based on the information and based on the token value.

18 Claims, 4 Drawing Sheets

(51) Int. Cl.
*H04L 12/801* (2013.01)
*H04L 12/819* (2013.01)
*H04L 12/815* (2013.01)

(56) References Cited

U.S. PATENT DOCUMENTS

| | | | |
|---|---|---|---|
| 6,418,497 | B1 | 7/2002 | Guthrie et al. |
| 6,650,624 | B1 * | 11/2003 | Quigley et al. ............... 370/252 |
| 6,757,249 | B1 | 6/2004 | Kejriwal et al. |
| 6,882,642 | B1 * | 4/2005 | Kejriwal et al. ............... 370/388 |
| 2001/0049711 | A1 | 12/2001 | Nishihara |
| 2002/0083298 | A1 | 6/2002 | Cook et al. |
| 2003/0069970 | A1 | 4/2003 | Kim et al. |
| 2003/0152076 | A1 | 8/2003 | Lee et al. |
| 2006/0133279 | A1 | 6/2006 | Le Faucheur et al. |

FOREIGN PATENT DOCUMENTS

| | | |
|---|---|---|
| WO | WO-02096043 A1 | 11/2002 |
| WO | WO-2004/010288 A1 | 1/2004 |

* cited by examiner

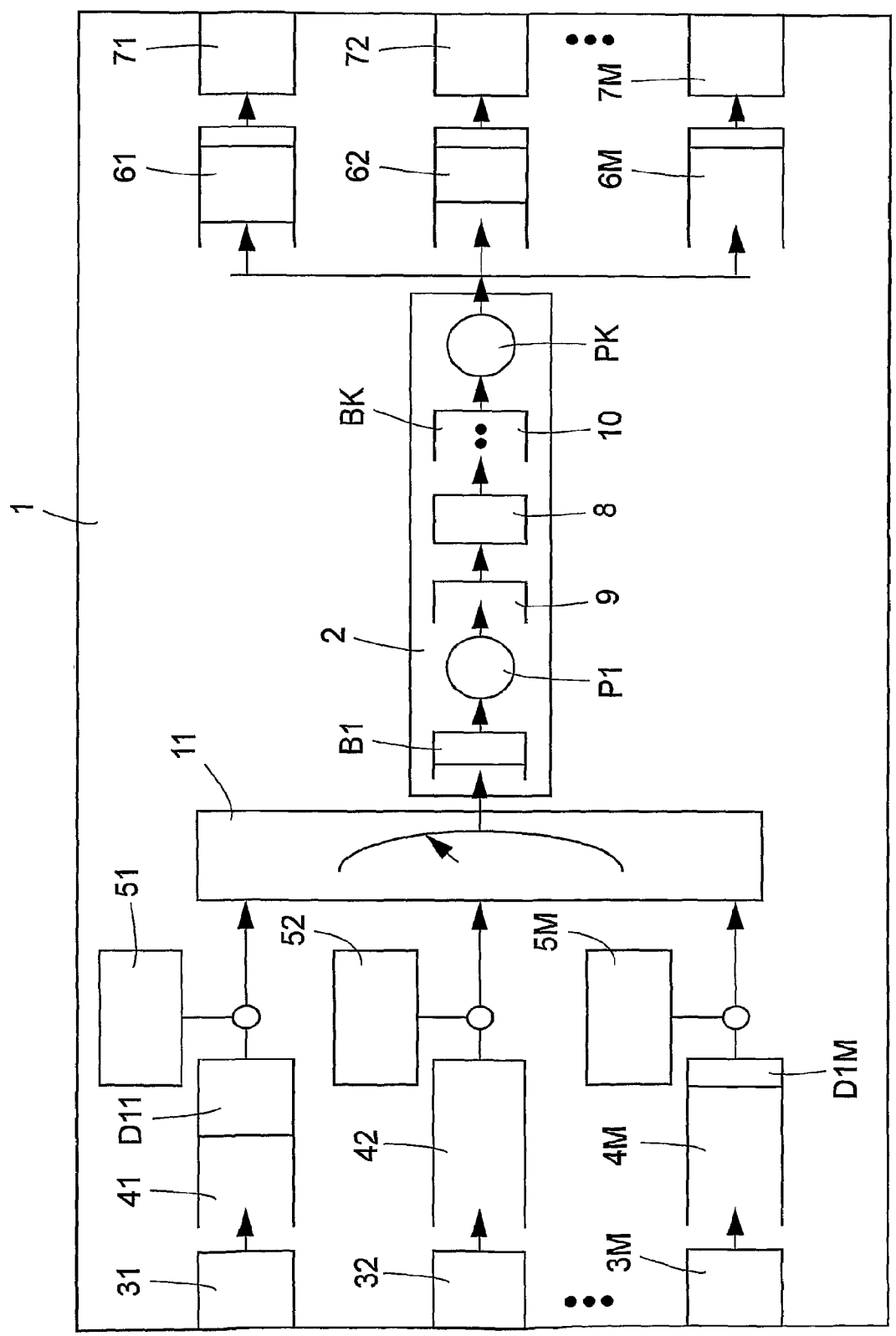

METHOD FOR REDUCING BUFFER CAPACITY IN A PIPELINE PROCESSOR

CROSS-REFERENCE TO RELATED APPLICATIONS

This application is a continuation of U.S. patent application Ser. No. 11/722,470 (now U.S. Pat. No. 8,250,231), filed on Nov. 28, 2007, which is a National Stage of International Application No. PCT/SE2005/001969, filed Dec. 20, 2005, which claims benefit of Swedish Application No. 0403128-2, filed Dec. 22, 2004 and U.S. Provisional Application No. 60/643,580, filed on Jan. 14, 2005. The disclosures of the above applications are incorporated herein by reference in their entirety.

FIELD

The present invention relates to a method for a processor comprising a processing pipeline and at least one interface for data packets.

BACKGROUND

In a pipelined network processor, data packets are processed in processing units, or processing elements, through which the data packets are transferred sequentially. In asynchronous pipelines, the admission to a processing element is given independently of admission to other processing elements. In known pipeline processors, incoming traffic is admitted to the sequence of processing elements so as to accomplish a constant bit rate, or admitted as quickly as possible without controlled admittance limitation, whereby limitations are given by processing capabilities. In cases where packets have different processing requirements, or are of different size, relatively large buffer capacities are required between the processing elements, since packets may be queued waiting for a time consuming process to be completed in the following processing element. In other words, since the maximum packet rate is given by the pipeline bandwidth (bits/s) and the minimum packet size, different packets may need to wait in different processing element FIFOs, making sum of PE FIFO sizes large.

SUMMARY

It is an object of the invention to reduce buffer capacity needed in a pipeline processor.

This object is reached with a method for a processor comprising a processing pipeline and at least one interface for data packets, the method comprising the step of giving a second data packet admittance to the pipeline in dependence on cost information, dependent upon an expected time period of residence of a first data packet in at least a part of the pipeline.

The invention is specially suitable in conjunction with a network processor. The cost information could depend on the longest time period of residence of the first data packet in a processing element of the processing pipeline. The cost can be defined in alternative ways. A preferred definition is as follows: Assume that a data packet D1 enters an empty processing pipeline at time TM_ENTRY_1 and exits the processing pipeline at time TM_EXIT_1. A succeeding data packet D2 enters the processing pipeline at time TM_ENTRY_2 and exits the processing pipeline at time TM_EXIT_2. The cost C1 of the data packet D1 is based on the minimum time difference C1=TM_ENTRY_2−TM-ENTRY1 which will prevent the data packet D2 from having to wait for any busy processing element in the processing pipeline, or an approximation greater than or equal to this time difference. Thus, the cost C1 is based on the longest time that the data packet D1 keeps any element in the processing pipeline busy from accepting new packets, see further below.

The invention will avoid situations where a queue is formed behind a packet being processed for a long time. Since the invention will reduce the risk of a data packet having to wait at any part of the pipeline, the invention provides for the storage capabilities of the pipeline to be reduced, in relation to pipelines according to known art.

In one embodiment, the first data packet is identical with the second data packet. On other words, the admittance of a data packet is dependent on the cost of the packet itself. Thereby, a so called strict token bucket algorithm can be used for admittance of data packets to the pipeline, whereby the bucket level is periodically incremented by a fixed credit amount, and when the credit is at least as large so as to correspond to the cost of the next data packet in turn, this data packet is admitted to the pipeline, whereby the token bucket level is reduced by an amount corresponding to said cost of the data packet.

However, in a preferred embodiment the first and second data packets are not identical, and the first data packet enters the pipeline before the second data packet. Thereby, the admission to the pipeline can be determined by a so called loose token bucket algorithm, whereby the bucket level is periodically incremented by a fixed credit amount. Preferably, regardless if a strict or loose token bucket algorithm is used, at each instance at which the credit level of a token bucket is incremented, the credit level is incremented by a predetermined amount, e.g. one bit. When the credit has reached a predetermined value, e.g. when the credit is zero or positive, the next data packet in turn, here the first data packet, is admitted to the pipeline, whereby the token bucket level is reduced by an amount corresponding to the cost of the first data packet. Since the credit value after admittance of the first data packet is dependent on the cost of the latter, and the next data packet, here the second data packet, is not admitted until the credit again has reached the predetermined value, the admittance of the second data packet is dependent on the cost of the first data packet. This is an advantage, since direct correlation between admittance of a packet and the cost of the previous packet will further reduce the risk that any packet will have to wait for a processing element complete the processing of a preceding package.

Preferably, regardless if a loose or strict token bucket algorithm is used, the cost information is determined as C=N*T/D, where C is the cost of a packet, N is the number of packet input ports or interfaces to the pipeline of the processor, T is the maximum blocking time for any processing element in the pipeline due to processing of the packet, and D is the time period between two consecutive increments of the credit level of the token bucket at each interface.

Thus, as an example, if there is only one input port for packets to the pipeline, i.e. N=1, and also if T=1, and D=1, then C=1. If there is more than one input port, preferably round robin scheduling is used for sharing the pipeline. Thus, as an ex-ample, if there are two input ports for packets to the pipeline, i.e. N=2, and also if T=1, and D=1, then C=2.

Alternatively, in the case of the processor being provided with more than one input port, the processing capability can be asymmetrically shared between the input ports. Thereby, each input port K=1, 2, 3 . . . N can have an associated weight M_K such that M_1+M_2+ . . . +M_N=N, and the cost for a packet received through the input port K is C_K=M_K*N*T/D.

As an alternative, the cost information is determined as $C>N*T/D$, i.e. the cost is set to be at least $N*T/D$. This can be useful in the case a user does not want to, or cannot utilize the full capacity of the pipeline.

According to one embodiment, cost information, dependent upon an expected time period of residence of the second data packet in at least a part of the pipeline, differs from said cost information dependent upon an expected time period of residence of the first data packet in at least a part of the pipeline. In other words, the cost information is "packet-specific". As a result, a high accuracy of the packet admittance control can be achieved, since the cost information about individual packets can be obtained. Preferably, thereby the cost information is stored in a header of the respective data packet. Alternatively, other storage forms for the cost information are possible, for example in the respective packet trailer, or in a separate control channel which is parallel to a packet input buffer.

Alternatively, or additionally, the cost information corresponds to predetermined "interface-specific" information, dependent upon an assumption of the cost of a plurality of data packets. Thereby, in a case where it is known beforehand that packets, e.g. from one or more of the interfaces, have similar costs, a general assumption makes it unnecessary to read such information in connection to the individual packets, and thereby the process of packet admittance can be simplified. More specifically, at an interface a plurality of, or all packets will be assumed to have the same cost, corresponding to predetermined information, so that interface-specific cost information is formed. Preferably, the interface-specific information is based on an estimation of a maximum cost for a plurality of packets. Where the processor comprises at least two interfaces for data packets, the cost information for packets at least one of the interfaces can differ from cost information for packets at least one of the other interfaces, making it possible to assign costly packets to a certain interface with a certain interface-specific cost assumption, and less costly packets to another interface with another interface-specific cost assumption.

According to one alternative, the pipeline processor comprises at least two interfaces for data packets, whereby the cost information for data packets at a first interface is interface-specific and differs from interface-specific cost information for data packets at a second interface.

As an alternative, the method comprises the steps of inspecting a plurality of packets, determining packet costs and storing, for packets having costs exceeding a predetermined value, cost information as packet-specific cost information Preferably, said step, of giving a second data packet admittance to the pipeline, is performed at a first interface with use of a token bucket algorithm, whereby the credit of the token bucket is adjusted based on said cost information, whereby an overflow of credit from the token bucket of the first interface is transferred to an overflow token bucket for admittance of packets at a second interface.

The overflow bucket makes it possible to allow one more expensive packet into the pipeline via the second interface. Thereby, ordinary traffic packets, herein also referred to as forwarding plane packets, can be introduced through the first interface, and expensive packets, can be introduced through the second interface. Preferably, the FIFO buffer sizes in the pipeline are dimensioned for the queue built up after such an expensive packet. Alternatively, the FIFO buffer sizes are dimensioned for the queue built up after one or more than one such expensive packet. Preferably, the overflow bucket is refilled before a new expensive packet can be sent into the pipeline. This guarantees that the buffer built up in the pipeline is back at normal levels before the next expensive packet arrives and makes the queue grow again. An example of such expensive packets is packets for control and management, herein also referred to as control and management packets, sent to the processor by an external CPU.

Preferably, at the second interface, admittance is given both to packets whose cost information correspond to an interface-specific predetermined value, described above, and also to packets that have individual, packet-specific cost information, also described above.

The object of the invention is also reached by a processor and by a router or a computer unit.

BRIEF DESCRIPTION OF DRAWINGS

The present disclosure will become more fully understood from the detailed description and the accompanying drawings, wherein:

FIG. 3 is a block diagram corresponding to a processor according to a another embodiment of the present invention.

DESCRIPTION

Figure 1:
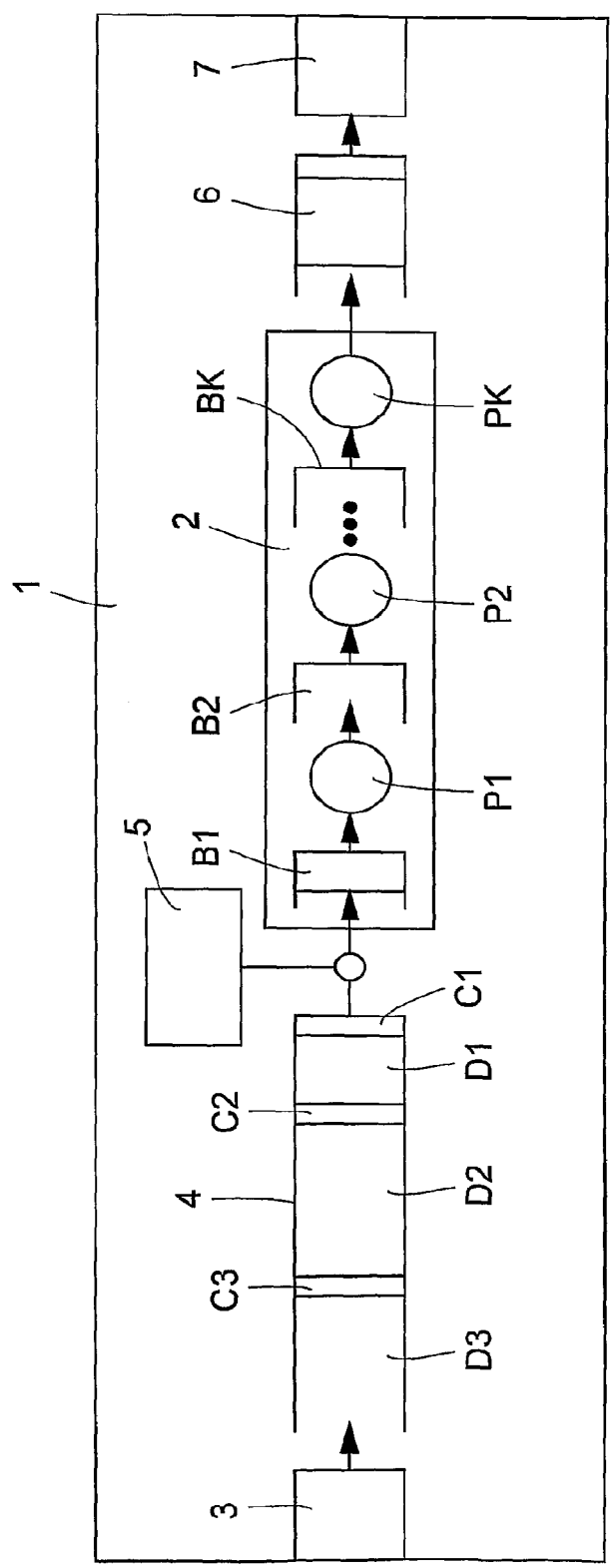
FIG. 1 is a block diagram corresponding to a processor according to one embodiment of the present invention.

FIG. 1 illustrates a first embodiment of the present invention. A network processor processing pipeline 1 comprises an asynchronous processing pipeline 2, in turn comprising a plurality of processing elements P15 P2, . . . , PK. Any of the processing elements P1, P2, . . . , PK, can be an access point for access to a processing device, or engine, as described in WO2004/010288, included herein by reference. Data traffic is forwarded from left to right in the figure. In the direction of the data traffic, before each processing element P1, P2, . . . , PK, a processing element buffer B1, B2, . . . , BK is provided, in the form of a FIFO buffer. In each buffer B1, B2, . . . , BK data packets can be stored during processing of a preceding packet in the subsequent processing element P1, P2, . . . , PK, and upon completion of said processing the next packet in turn is admitted to the subsequent processing element P1, P2, . . . , PK.

Data packets D1, D2, D3 enter the processor through an interface comprising an input port 3 and are stored in an input buffer 4. Each data packet D1, D2, D3 comprises a header with information c1, c2, c3 about the cost of the data packet. (The header can also include information about the size of the data packet.) The cost information c1, c2, c3 depends on information about the longest time that the respective data packet D1, D2, D3 keeps any of the processing elements P1, P2, . . . , PK in the processing pipeline 2 busy from accepting new data packets.

Preferably, the cost information c1, c2, c3 is determined as described above in the section "Summary", e.g. cl=N*T7D, where N (the number of input ports)=1 in this example, T is the maximum blocking time for any processing element P1, P2, . . . , PK in the pipeline 2 due to processing of the packet D1, and D is the time period between two consecutive increments of the credit level of a token bucket at the input port 3, see further below.

The cost information can be allocated to the respective data packet in a number of ways. For example, a user, aware in advance of the processing cost of the data packet, can transmit the cost information with the data packet, for example in a header, as depicted in FIG. 1. Alternatively, a classifier of the processor can be adapted to inspect packets and determine packet costs, ("pre-classification"). As a further alternative, as will be described further below, the cost can be set to be the same for all packets at an interface, i.e. the cost for all packets corresponds to a pre-determined interface-specific value.

Figure 1A:
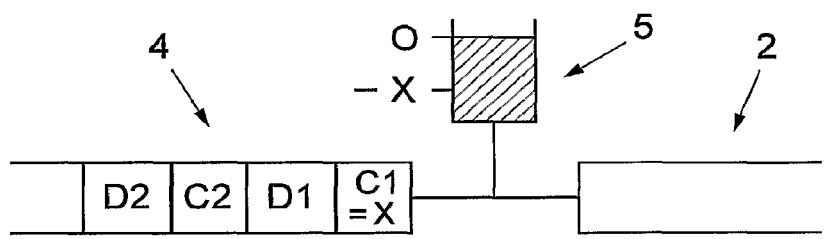
FIGS. 1a and 1b are a block diagrams corresponding to a part of the processor to which the diagram in FIG. 1 corresponds.
Figure 1B:
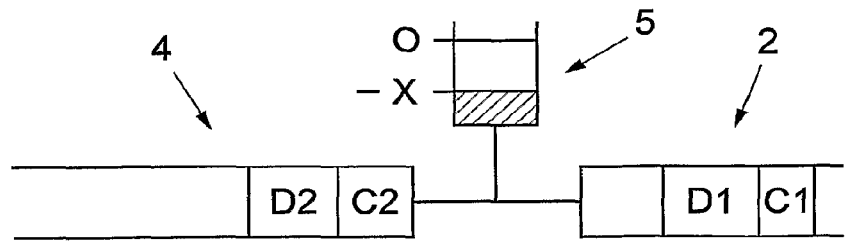

Admission to the pipeline 2 is determined by a token bucket algorithm, performed by a packet rate shaper 5, herein also referred to as a shaper 5. The shaper 5 is adapted to read cost information c1, c2, c3 related to the incoming packets D1, D2, D3. Preferably, the shaper uses a so called loose token bucket shaper, i.e. if the credit is negative, the bucket level is periodically, e.g. every clock cycle of the processor 1, incremented by a fixed credit amount. When the credit is zero or positive, the next packet D1 in turn in the input buffer 4 is admitted to the pipeline 2, whereby the token bucket level is reduced by an amount corresponding to the cost c1 of the packet Dl. FIGS. 1a and 1b depict schematically this mechanism. The cost c1 of the next packet Dl in turn in the input buffer 4 is X and since the bucket level of the shaper 5 is at zero, the packet Dl is admitted to the pipeline 2. Thereby, the bucket level is decreased by X, and the next packet D2 in the input buffer will have to wait until the bucket level has again reached zero, before being admitted to the pipeline.

Alternatively; a strict token bucket algorithm is used, whereby the bucket level is periodically incremented by a fixed credit amount, and when the credit is at least as large so as to correspond to the cost c1 of the next packet D1 in turn, this packet D1 is admitted to the pipeline 2, whereby the token bucket level is reduced by an amount corresponding to the cost c1 of the packet D1. However, it is preferred to use the loose token bucket algorithm, since it involves less operational steps than the strict version, due to the fact that in the loose version the only condition to admit a packet is a non-negative credit level, and therefore no comparison has to be made between the credit of the token bucket and the cost of the packet in turn.

Since the cost information is based on the predicted amount of operations of the packets D1, D2, D3 in the pipeline, and the amount of operations is proportional to the processing time of the packets, shaping the stream of data packets according to the invention will result in the packet stream being adapted to the processing requirements of the packets, which in turn will make it possible to keep the sizes of the processing element buffers B1, B2, . . . , BK small.

After exiting the pipeline 2, the packets are stored in an output buffer 6 before being transmitted through an output port 7.

As an alternative to reading cost information c1, c2, c3 stored in the header of the packets D1, D2, D3, the shaper 5 can adjust the level of the token bucket with an interface-specific predetermined value. Preferably, the interface-specific value corresponds to an estimation of a maximum cost for the incoming packets.

It is also possible to mix, at an interface, packets whose cost information correspond to an interface-specific predetermined value, described above, and packets that have individual, packet-specific cost information, also described above. Thereby, a classifier, such as one described above, can inspect packets and determine packet costs and store, for packets having costs exceeding a predetermined value, cost information as packet-specific cost information. Thereby, more flexibility and efficiency is achieved in that unusually costly packets can be handled without the interface-specific cost information having to assume a value that is un-practically high.

Figure 2:
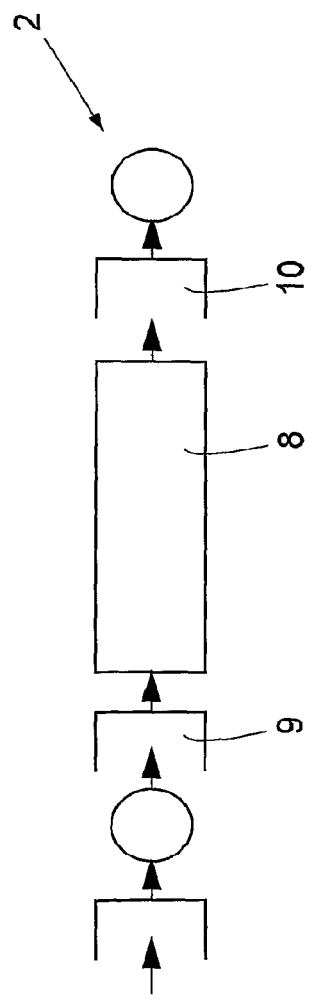
FIG. 2 is a block diagram corresponding to a part of a processor according to a further embodiment of the present invention.

Referring to FIG. 2, it should be noted that the pipeline may contain at least one synchronous element 8, with elastic buffering 9, 10 before and after each synchronous element 8. However, this does not change the inventive concept as presented here.

Referring to FIG. 3, a second embodiment of the invention is illustrated. A network processor 1 comprises an asynchronous processing pipeline 2, similar to the pipeline described above with reference to FIG. 1, but also including a synchronous element 8, with elastic buffering 9, 10, as described with reference to FIG. 2.

Data packets D11, . . . D1M enter the processor through interfaces each comprising an input port 31, 32, . . . 3M, and are stored in respective input buffers 41, 42, 4M. A pipeline arbiter 11, 51, 52, . . . 5M comprises a scheduler 11 and a plurality of shapers 51, 52, . . . 5M. In particular, for each pair of input port 31, 32, . . . 3M and input buffer 41, 42, . . . 4M, a shaper 51, 52, . . . 5M is provided, each performing shaping according to a token bucket algorithm. In this presentation, a scheduler or a token bucket being provided at an interface or an input port, indicates that it is either physically provided by, or functionally connected to the interface or the input port. Admission to the pipeline 2 is determined by the shapers 51, 52, . . . 5M and the scheduler 11, which operates according to a Round Robin algorithm, whereby access to the pipeline is given to the shapers 51, 52, . . . 5M in a continuous sequence of pollings by the scheduler 11. Besides the Round Robin algorithm, alternative scheduling disciplines could be used, for example weighted fair queuing, deficit round robin, deficit weighted round robin, strict priority queuing, and first-come first-serve.

When a packet D11, . . . D1M is entered into the pipeline 2, the respective token bucket credit is adjusted, i.e. decreased, according to a respective interface-specific predetermined cost value c1, c2, . . . cM. In this embodiment, the cost values c1, c2, . . . cM of the shapers 51, 52, . . . 5M differ from each other. Thereby, packets received on an interface have similar needs for processing due to the overall system properties. E.g., one interface may receive packets from a line which will be classified and switched, whereas another interface receives packets from a switch fabric, which packets typically require less processing before transmission. Thus, the embodiment illustrated in FIG. 3 provides multiple input buffers with specific per-buffer costs; e.g., one buffer per physical/logical interface, where different interfaces have different processing needs. Of course, as an alternative, two or more shapers can operate with the same cost value.

In this embodiment, an interface-specific cost value c1, c2, . . . cM for a specific shaper 51, 52, . . . 5M is determined as N*T/D, where N is the number of input ports 31, 32, . . . 3M, T is the maximum blocking time at any processing element in the pipeline due to processing of a packet admitted by the shaper 51, 52, . . . 5M, and D is the periodic increase of the credit level of the token bucket at the shaper 51, 52, . . . 5M.

The token bucket algorithms of the shapers 51, 52, . . . 5M in FIG. 3 are preferably loose, as described above. If the rate of cycles for token deposits to the respective shaper 51, 52, . . . 5M is higher than the rate of pollings of the respective shaper 51, 52, . . . 5M by the scheduler 11, it is preferred that the bucket level for each shaper 51, 52, . . . 5M is incremented if it is lower than a burst size B. Thereby, B is the maximum number of clock cycles, or token deposits, between two consecutive pollings of the respective shaper 51, 52, . . . 5M by the scheduler 11. As a result, no tokens are wasted, in a case where a shaper 51, 52, . . . 5M is ready to forward a packet D11, . . . D1M, but the scheduler 11 is serving another shaper 51, 52, . . . 5M.

The same strategy can of course be used in conjunction with a strict token bucket algorithm.

After exiting the pipeline 2, each packet D11, . . . D1M is transmitted through one of several output ports 71, 72, . . . 7M5 after passing through a respective output buffer 61, 62, . . . 6M.

As an alternative to the interface-specific predetermined cost values $c_1, c_2, \ldots c_M$, the shapers 51, 52, . . . 5M can allow packets D11, . . . D1M to be forwarded on the basis of cost information in a header of each package, as described above with reference to FIG. 1. As a further alternative, a mixed strategy can be used, where one or more of the shapers 51, 52, . . . 5M uses the strategy with interface-specific predetermined cost values, and one or more of the shapers 51, 52, . . . 5M uses the strategy with cost information in the headers of the packets.

Some packets, e.g. packets for control and management of the processor, sent from an external CPU, result in operations at the processing elements P1, P2, . . . , PK that consume more clock cycles, and therefore have a higher cost than regular operations, e.g. forwarding plane engine accesses, on normal traffic packets. Writing to certain types of TCAM is an example of such control and management engine accesses. If the processing speeds of the pipeline elements P1, P2, . . . , PK are adapted to regular operations on normal traffic packets, and the packet rate shapers 51, 52, . . . , 5M of the pipeline arbiter are configured to match these processing speeds, a "cycle-expensive", i.e. costly process, e.g. in the form of a control and management engine access, may cause a build-up of requests in the request FIFO of the affected processing element. To avoid overflow in the request FIFOs, the latter must be allowed to drain before a new cycle-expensive control and management packet can be inserted in the programmable pipeline 2.

Figure 4:
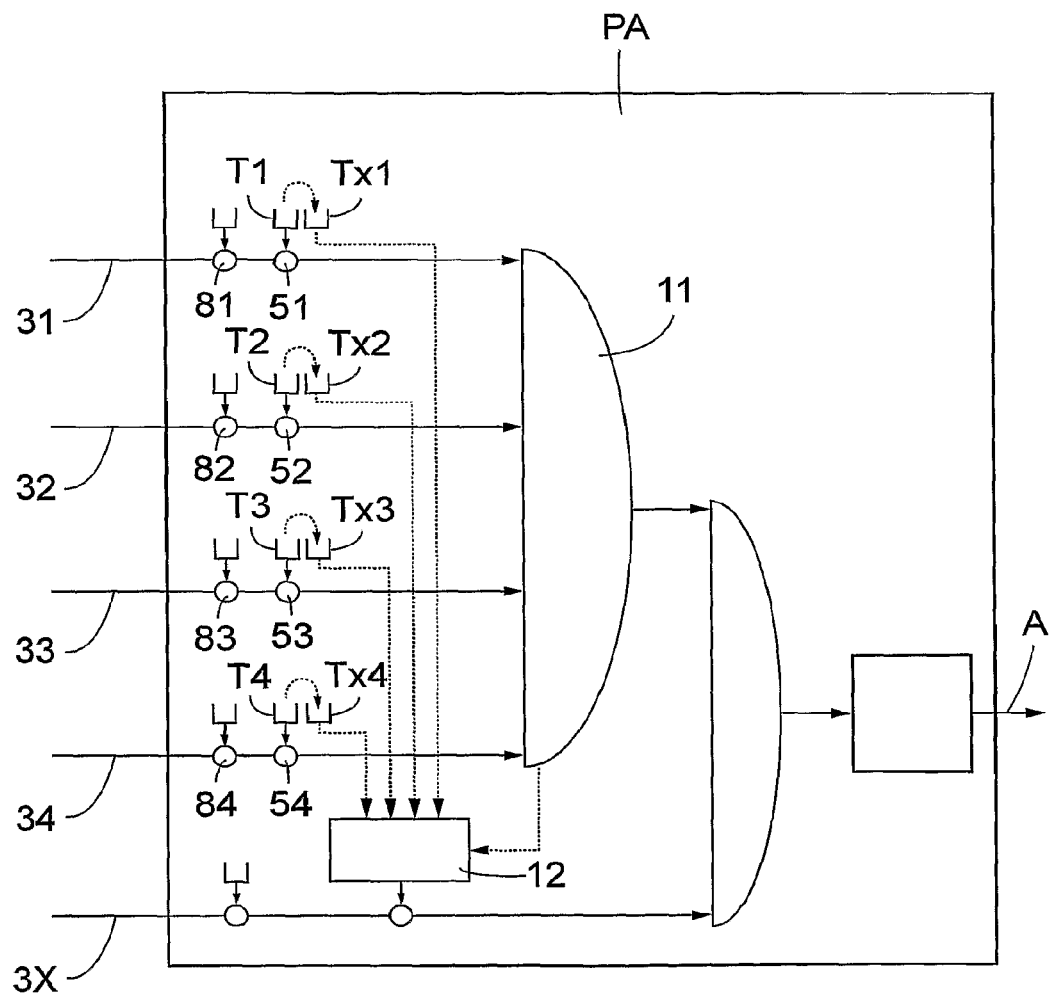
FIG. 4 is a block diagram corresponding to a part of a processor according to a yet another embodiment of the present invention.

Referring to FIG. 4, a pipeline arbiter PA is shown with five interfaces 31, 32, 33, 34, 3X for incoming data traffic, the pipeline arbiter being adapted to forward data traffic to a processing pipeline as indicated by the arrow A. Of course the pipeline arbiter could in principle include any number of interfaces. To solve the problem above, a preferred embodiment of the invention includes specifying in the pipeline arbiter PA an interface as an interface 3X for low priority data packets, herein also referred to as a control and management packet interface 3X, such as for control and management packets.

In this example, four of the interfaces 31, 32, 33, 34 are adapted for ordinary data traffic, herein also referred to as forwarding plane packets. The pipeline arbiter PA presents a bit rate shaper 81, 82, 83, 84 at each ordinary traffic interface 31, 32, 33, 34. Preferably, the bit rate shapers 81, 82, 83, 84 are also loose token buckets. They are useful for limiting data burst sizes, and for limitation and reservation of per-interface bandwidths in oversubscribed systems. Alternatively, one or more of the interfaces of the arbiter could be provided without such bit rate shapers, for example in the case of fixed packet sizes passing through one or more of the interfaces, e.g. in ATM or other cell-based systems.

As can be seen in FIG. 4, the control and management packet interface 3X does not have a packet rate shaper 51, 52, 53, 54 as provided by the other interfaces. The packet rate shapers 51, 52, 53, 54 each includes a packet rate shaper token bucket T1, T2, T3, T4 for shaping of the data traffic with a token bucket algorithm as described above with reference to FIG. 3. In addition, each packet rate shaper 51, 52, 53, 54 of each packet interface also comprises an overflow token bucket TX1, TX2, TX3, TX4. As indicated by the curved arrows in FIG. 4, each overflow token bucket TX1, TX2, TX3, TX4 receives packet start tokens which overflow from the respective packet rate shaper token bucket T1, T2, T3, T4 when it is full, more particularly zero or at some other predetermined level. Preferably, the packet rate shaper token buckets T1, T2, T3, T4, as well as the overflow token buckets TX1, TX2, TX3, TX4 are a loose token buckets, as described above.

Similar to the embodiment in FIG. 3, the embodiment in FIG. 4 comprises a scheduler 11, which operates according to a Round Robin algorithm, whereby access to the pipeline is given to the shapers 51, 52, 53, 54 in a continuous sequence of pollings by the scheduler 11.

According to one alternative, the scheduler 11 according to a strict priority queuing discipline, whereby different queues can have different priorities. Thereby, when the scheduler 11 decides what queue to serve next, the rule is to serve a queue that has packets and does not have lower priority than any other queue that has packets.

The pipeline arbiter PA includes a comparison function 12, which compares the level of the overflow token bucket TX1, TX2, TX3, TX4 of the shaper 51, 52, 53, 54 served by the scheduler 11 with control and management packet header information.

Preferably, additional cost information is provided, which can be provided in the header of the packets, or alternatively in the respective packet trailer, or in a separate control channel which is parallel to a packet input buffer. The additional cost information is based on the difference between a forwarding plane data packet and a control and management packet, regarding the maximum time period of a pipeline element being busy due to processing. Extra Packet Spacing can also be said to define the additional cost for a control and management packet in relation to a forwarding plane data packet. For example, if a certain packet for control and management has a worst-case cost of 10 cycles where a forwarding plane packet has a cost of 2 cycles, the additional cost information is set to 10−2=8. For a control and management packet which does not have a larger cost than a forwarding plane packet, the additional cost information is set to zero.

Preferably, a condition for admitting a control and management packet in the control and management packet interface 3X to the processing pipeline is that there is no packet in the interface 31, 32, 33, 34 presently served by the scheduler 11.

Preferably, the comparison function 12 compares the level of the overflow token bucket TX1 TX2, TX3, TX4 of the shaper 51, 52, 53, 54 served by the scheduler 11 with the additional cost information of the control and management packet. If the level of the overflow token bucket TX1 TX2, TX3, TX4 is zero or positive, the control and management packet is admitted to the pipeline. Thereby, the level of the overflow token bucket TX1 TX2, TX3, TX4 of the shaper 51, 52, 53, 54 served by the scheduler 11 is reduced by an amount corresponding to the additional cost information. Also, the corresponding packet rate shaper token bucket T1 T2, T3, T4 is reduced by an amount corresponding to the cost of a forwarding plane packet. Thus, if the cost of a forwarding plane packet is 2 and the additional cost for the control and management packet admitted to the pipeline is 8, the packet rate shaper token bucket T1 T2, T3, T4 is reduced by 2, and the corresponding overflow token bucket TX1 TX2, TX3, TX4 is reduced by 8.

Of course, alternatives for the admittance procedure of a control and management packet are possible. For example, a condition for admitting a control and management packet can be that the levels of at least two overflow token buckets TX1, TX2, TX3, TX4 are zero or positive, whereby at least two of these overflow token buckets are reduced by the additional cost when the packet is admitted. Additionally, different conditions for admittance of control and management packets can be specified, whereby the choice of such conditions is packet-specific. For example, a higher priority could be assigned to control and management packets than ordinary traffic packets, and such information could also be contained in the control and management packet header, for priority decisions on an individual packet basis.

As a further alternative, a strict token bucket algorithm can be used for the admittance of control and management packets.

With the proposed embodiment, described with reference to FIG. 4, the processing element buffers or FIFOs B1, B2, . . . , BK are guaranteed to drain before a cycle-expensive control and management packet is inserted. This prevents overflow in the pipeline element FIFOs. The inventive solution provides an effective use of processing capabilities in relation to known art solutions, the latter including a control plane CPU inserting dummy, no-operation control and management packets, which in-creases the control plane load.

The processor 1, and the method described above is applicable to a router or a computer unit for firewall appliances, and also to all kinds of computer units, where the computer units would benefit from pipelining. Examples of such computer units are network computer units such as: switches; gateways, i.e. computer units that perform protocol conversion between different types of networks and applications, and load balancing units for Web-servers.

The invention is also applicable to computer units involved in digital signal processing, i.e. the analyzing and/or modifying of signals from sources such as sound, weather satellites and earthquake monitors. The data packets received by the processor 1 may in this case be a digital representation of an analogue signal sequence. Fields where digital signal processing in connection with the invention is used, are e.g. biomedicine, sonar, radar, seismology, speech and music processing, imaging, multimedia applications and communications.

What is claimed is:

1. A packet processor implemented in hardware, the packet processor comprising:
   a processing pipeline including a plurality of processing elements, the plurality of processing elements configured to process a first data packet transferred sequentially through the plurality of processing elements, wherein the first data packet includes information indicating a period of time that at least a first processing element of the plurality of processing elements uses to process the first data packet, wherein the first processing element is prevented from processing other data packets due to performing processing on the first data packet during the period of time; and
   a packet rate shaper configured to, prior to the first data packet entering the processing pipeline,
     i) read the information in the first data packet,
     ii) selectively increment and decrement a token value, and
     iii) selectively grant the first data packet access to the processing pipeline based on the information and based on the token value.

2. The packet processor of claim 1, wherein the information is based, in part, on a number of input ports of the packet processor.

3. The packet processor of claim 1, further comprising: a classifier configured to i) inspect the first data packet, and ii) modify the first data packet to include the information based on the inspection of the first data packet.

4. The packet processor of claim 1, wherein the first data packet is received, with the information, at the packet processor.

5. The packet processor of claim 1, wherein the information is predetermined based on a type of the first data packet.

6. The packet processor of claim 1, wherein the period of time corresponds to a maximum period of time that one of the plurality of processing elements is prevented from processing the other data packets.

7. The packet processor of claim 1, wherein the packet rate shaper is configured to: if the token value is negative, i) prevent the first data packet from accessing the processing pipeline, and ii) increment the token value, and if the token value is not negative, i) grant the first data packet access to the processing pipeline, and ii) decrement the token value by an amount corresponding to the information.

8. The packet processor of claim 1, wherein the packet rate shaper is configured to: if the token value is less than an amount corresponding to the information, i) prevent the first data packet from accessing the processing pipeline, and ii) increment the token value, and if the token value is greater than or equal to the amount, i) grant the first data packet access to the processing pipeline, and ii) decrement the token value by the amount.

9. The packet processor of claim 1, wherein the packet rate shaper is configured to selectively increment and decrement the token value at each clock cycle of the packet processor.

10. A method of operating a packet processor implemented in hardware, the method comprising:
    prior to a first data packet entering a processing pipeline of the packet processor,
      reading information in a first data packet, the information indicating a period of time that at least a first processing element of a plurality of processing elements of the processing pipeline uses to process the first data packet, wherein the first processing element is prevented from processing other data packets due to preforming processing on the first data packet during the period of time;
    selectively incrementing and decrementinq a token value;
    selectively granting the first data packet access to the processing pipeline based on the information and based on the token value; and
    processing the first data packet using the plurality of processing elements, wherein the first data packet is transferred sequentially through the plurality of processing elements.

11. The method of claim 10, wherein the information is based, in part, on a number of input ports of the packet processor.

12. The method of claim 10, further comprising: inspecting the first data packet; and modifying the first data packet to include the information based on the inspection of the first packet.

13. The method of claim 10, further comprising: receiving the first data packet, with the information, at the packet processor.

14. The method of claim 10, wherein the information is predetermined based on a type of the first data packet.

15. The method of claim 10, wherein the period of time corresponds to a maximum period of time that one of the plurality of processing elements is prevented from processing the other data packets.

16. The method of claim 10, further comprising: if the token value is negative, i) preventing the first data packet from accessing the processing pipeline, and ii) incrementing the token value; and if the token value is not negative, i) granting the first data packet access to the processing pipeline, and ii) decrementing the token value by an amount corresponding to the information.

17. The method of claim 10, further comprising: if the token value is less than an amount corresponding to the information, i) preventing the first data packet from accessing the processing pipeline, and ii) incrementing the token value; and if the token value is greater than or equal to the amount, i) granting the first data packet access to the processing pipeline, and ii) decrementing the token value by the amount.

18. The method of claim 10, further comprising: selectively incrementing and decrementing the token value at each clock cycle of the packet processor.

* * * * *